(12) United States Patent
Mitadera et al.

(10) Patent No.: US 6,962,743 B2
(45) Date of Patent: Nov. 8, 2005

(54) BIAXIALLY STRETCHED FILM AND PRODUCTION METHOD THEREOF

(75) Inventors: Jun Mitadera, Kanagawa (JP); Kazunobu Sato, Kanagawa (JP); Koji Yamamoto, Kanagawa (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 93 days.

(21) Appl. No.: 10/396,349

(22) Filed: Mar. 26, 2003

(65) Prior Publication Data
US 2003/0190489 A1 Oct. 9, 2003

(30) Foreign Application Priority Data
Apr. 3, 2002 (JP) .................................... 2002-101297

(51) Int. Cl.⁷ .................. B32B 19/00; B32B 19/02; B32B 27/08; B32B 27/34
(52) U.S. Cl. ................. 428/220; 428/307.3; 428/339; 428/475.5
(58) Field of Search ............. 428/220, 307.3, 428/339, 475.5

(56) References Cited

U.S. PATENT DOCUMENTS

| 5,994,445 | A | 11/1999 | Kaschel et al. |
| 6,232,388 | B1 | 5/2001 | Lan et al. |
| 6,515,099 | B2 * | 2/2003 | Sato et al. .................. 528/310 |

FOREIGN PATENT DOCUMENTS

| EP | 1 156 073 | 11/2001 |
| JP | 3286826 | 12/1991 |
| JP | 2001-329168 | 11/2001 |

OTHER PUBLICATIONS

Giannelis, "Polymer Layered Silicate Nanocomposites", Ad. Mater., Jan. 1996, vol. 8, No. 1, pp. 29–35.

* cited by examiner

*Primary Examiner*—Ana Woodward
(74) *Attorney, Agent, or Firm*—Antonelli, Terry, Stout & Kraus, LLP

(57) ABSTRACT

The biaxially stretched film of the present invention comprises a polyamide resin composition (C) obtained by melt-kneading a smectite (B) with a polyamide (A) produced by the polycondensation of a diamine component containing 70 mol % or higher of m-xylylenediamine and a dicarboxylic acid component containing 70 mol % or higher of a $C_4$–$C_{20}$ α,ω-linear aliphatic dicarboxylic acid, or comprises at least one layer made of the polyamide resin composition (C). The polyamide resin composition (C) comprises the polyamide (A) in an amount of 80 to 99.9 parts by weight and the smectite (B) in an amount of 0.1 to 10 parts by weight. The layer made of the polyamide resin composition (C) has a relative peak intensity ratio of 60 or less. The relative peak intensity ratio is represented by the formula: B/A×100, wherein A and B are intensities of the strongest peak and the next stronger peak appearing in a diffraction angle 2θ ranging from 15° to 25° of a CuKα X-ray diffraction pattern of the layer made of the polyamide resin composition (C), provided that A is the peak intensity of the peak at a lower angle and B is the peak intensity of the peak at a higher angle.

13 Claims, No Drawings

BIAXIALLY STRETCHED FILM AND PRODUCTION METHOD THEREOF

FIELD OF THE INVENTION

1. Field of the Invention

The present invention relates to a biaxially stretched film having a gas barrier property, and a process for producing the biaxially stretched film, and more particularly to a biaxially stretched film comprising a polyamide having a limited amount of smectite dispersed therein.

2. Description of the Prior Art

Polyamides have been used in extensive applications including not only injection-molding materials for automobiles and electric or electronic parts, but also packaging materials for foodstuffs, beverages, drugs and electronic parts, because of excellent mechanical properties and processability as well as relatively high gas barrier properties. Among these polyamides, poly(m-xylyleneadipamide) (hereinafter referred to as "nylon MXD6") produced by the polycondensation of a diamine component composed mainly of m-xylylenediamine and a dicarboxylic acid component composed mainly of adipic acid exhibits a low permeability to gaseous substances such as oxygen and carbon dioxide as compared to other polyamides, and therefore, has now been increasingly applied to packaging materials requiring a gas barrier property such as films and bottles. In recent years, there is a strong demand for packaging materials capable of keeping freshness of foodstuffs, beverages, etc., for a long period of time. For this reason, the nylon MXD6 has been required to have a further enhanced gas barrier property.

As a method of improving the gas barrier property of polyamide, Japanese Patent Application Laid-Open No. 2-305828 discloses a method of improving a gas barrier property of polyamide by kneading a polyamide resin with phyllosilicate using an extruder, etc. In this document, it is described that since the phyllosilicate can be dispersedly mixed into the nylon MXD6, the resulting molded products such as films are improved in the gas barrier property and show a good anti-whitening property. However, the anti-whitening property is attained only when applying such a method to limited resins such as lactam-based resins. For example, although non-stretched films made of polyamide MXD6 obtained by the polycondensation reaction between xylylenediamine and an aliphatic dicarboxylic acid show a practically acceptable haze, their biaxially stretched films exhibit an increased haze, thereby failing to satisfy a gas barrier property and a transparency at the same time. Japanese Patent No. 2,572,234 discloses a method in which after a polyamide monomer and clay mineral are mixed and polymerized, the polymerization is further proceeded by adding an anti-degradation agent or a colorant to obtain a polyamide composite material having a good transparency. However, this method is only applicable to limited resins such as lactam-based resins, but inapplicable to other resins such as polyamide MXD6 obtained by the polycondensation between xylylenediamine and an aliphatic dicarboxylic acid.

SUMMARY OF THE INVENTION

An object of the present invention is to solve the above problems in the prior art and provide a biaxially stretched film simultaneously having a good gas barrier property and an excellent transparency.

As a result of extensive studies in view of the above object, the inventors have found that a biaxially stretched film having a specific selected crystal structure, which is made of a polyamide resin composition obtained by melt-kneading a specific polyamide with a smectite composition optionally treated with an organic swelling agent, exhibits not only an excellent gas barrier property, but also an excellent transparency that has not been conventionally attained. The present invention has been accomplished on the basis of this finding.

Thus, according to an aspect of the present invention, there is provided a biaxially stretched film comprising a polyamide resin composition (C) obtained by melt-kneading a smectite (B) with a polyamide (A) produced by the polycondensation of a diamine component containing 70 mol % or higher of m-xylylenediamine and a dicarboxylic acid component containing 70 mol % or higher of a $C_4$–$C_{20}$ α,ω-linear aliphatic dicarboxylic acid, or comprising at least one layer made of the polyamide resin composition (C), wherein the polyamide resin composition (C) comprises the polyamide (A) in an amount of 80 to 99.9 parts by weight and the smectite (B) in an amount of 0.1 to 10 parts by weight and the layer made of the polyamide resin composition (C) has a relative peak intensity ratio of 60 or less, the relative peak intensity ratio being represented by the formula:

$$B/A \times 100$$

wherein A and B are intensities of the strongest peak and the next stronger peak appearing in a diffraction angle 2θ range from 15° to 25° of a CuKα X-ray diffraction pattern of the layer made of the polyamide resin composition (C), provided that A is the peak intensity of the peak at a lower angle and B is the peak intensity of the peak at a higher angle. Also, provided is a packaging container, at least a part thereof being made of the biaxially stretched film.

According to another aspect of the present invention, there is provided a process for producing a biaxially stretched film comprising a polyamide resin composition (C) obtained by melt-kneading a smectite (B) with a polyamide (A) produced by the polycondensation of a diamine component containing 70 mol % or higher of m-xylylenediamine and a dicarboxylic acid component containing 70 mol % or higher of a $C_4$–$C_{20}$ α,ω-linear aliphatic dicarboxylic acid, or comprising at least one layer made of the polyamide resin composition (C), the process comprising a step of successively and biaxially stretching a non-stretched film comprising the polyamide resin composition (C) or comprising at least one layer made of the polyamide resin composition (C) under conditions simultaneously satisfying the following formulae (1) to (6):

$$Tg \leq T \leq Tg+85 \tag{1}$$

$$0 < t_2 \leq 100 \tag{2}$$

$$1000 \geq (x/x_0) \times 100/t_1 \geq 100 \tag{3}$$

$$1000 \geq (y/y_0) \times 100/(t_3-t_2) \geq 50 \tag{4}$$

$$500 \geq (x/x_0) \times 100 \geq 150 \tag{5}$$

$$500 \geq (y/y_0) \times 100 \geq 150 \tag{6}$$

wherein Tg is a glass transition temperature of the polyamide (A); T is a stretching temperature; $t_1$ is a stretching time by second along x-axis; $t_2$ is a time by second taken from initiation of x-axis stretching to initiation of y-axis stretching; $t_3$ is a time by second taken from initiation of x-axis stretching to completion of y-axis stretching; $x_0$ is an x-axis length of a film before stretching; x is an x-axis length of a film after stretching; $y_0$ is a y-axis length of a film before stretching; and y is a y-axis length of a film after stretching, provided that the x-axis and the y-axis are perpendicular to each other and when one of the x-axis and y-axis is directed to MD direction (extruding direction of film), the other is directed to TD direction (width direction of film).

DETAILED DESCRIPTION OF THE INVENTION

The present invention is described in detail below.

The polyamide (A) used in the present invention is produced by polycondensing a diamine component composed mainly of m-xylylenediamine and a dicarboxylic acid component composed mainly of a $C_4$–$C_{20}$ α,ω-linear aliphatic dicarboxylic acid.

The diamine component used in the present invention contains m-xylylenediamine in an amount of 70 mol % or higher, preferably 75 mol % or higher and more preferably 80 mol % or higher. When less than 70 mol %, the polyamide (A) is deteriorated in gas barrier property.

Examples of other diamines usable in the diamine component include, but are not limited to, aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-tirmethylhexamethylenediamine and 2,4,4-tirmethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin and bis(aminomethyl)tricyclodecane; and aromatic diamines such as bis(4-aminophenyl) ether, p-phenylenediamine, p-xylylenediamine and bis(aminomethyl)naphthalene.

The dicarboxylic acid component used in the present invention contains a $C_4$–$C_{20}$ α,ω-linear aliphatic dicarboxylic acid in an amount of 70 mol % or higher, preferably 75 mol % or higher and more preferably 80 mol % or higher. When less than 70 mol %, the polyamide (A) is deteriorated in crystallinity, resulting in a poor gas barrier property. Examples of the $C_4$–$C_{20}$ α,ω-linear aliphatic dicarboxylic acid include aliphatic dicarboxylic acids such as succinic acid, glutaric acid, pimelic acid, suberic acid, azelaic acid, adipic acid, sebacic acid, undecanedioic acid and dodecandioic acid, with adipic acid being preferred. Examples of other dicarboxylic acids usable in the dicarboxylic acid component include aromatic dicarboxylic acids such as terephthalic acid, isophthalic acid, and 2,6-naphthalenedicarboxylic acid. In addition, a molecular weight modifier such as monoamines and monocarboxylic acids may be added to the polycondensation reaction system for the production of the polyamide (A).

The polyamide (A) may be produced by a melt polycondensation method. For example, a nylon salt of m-xylylenediamine and adipic acid is melt-polymerized by raising the temperature under pressure in the presence of water while removing water added and water generated during the polycondensation. Alternatively, m-xylylenediamine is directly added to molten adipic acid so as to proceed the polycondensation under ordinary pressure. In this method, the polycondensation is preformed by continuously adding m-xylylenediamine to molten adipic acid so as to keep the reaction system in a uniform liquid state while heating the reaction system so as to avoid the reaction temperature from being lower than the melting points of the oligoamide and polyamide being produced.

The polyamide (A) has a number-average molecular weight of preferably 10,000 to 50,000 and more preferably 15,000 to 45,000. The number-average molecular weight referred to herein is calculated from the following formula:

Number-average molecular weight=2,000,000/([COOH]+[NH$_2$])

wherein [NH$_2$] is a terminal amino concentration (μeq/g) and [COOH] is a terminal carboxyl concentration (μeq/g) of the polyamide (A), each measured by neutralization titration using hydrochloric acid or an aqueous solution of sodium hydroxide.

When the number-average molecular weight is less than 10,000, the melt viscosity of the polyamide (A) becomes too low. As a result, when melt-kneading the polyamide (A) and the smectite (B) by an extruder, a sufficient shear stress is not exerted on the smectite, resulting in an insufficient interlaminar expansion and a poor dispersion of the smectite. When exceeding 50,000, the melt viscosity of the polyamide (A) becomes too high. As a result, the polyamide (A) and the smectite (B) fail to be sufficiently melt-kneaded with each other by ordinary machines.

The number-average molecular weight of the polyamide (A) may also be represented by a relative viscosity thereof. The relative viscosity is measured on a solution of 1 g of the polyamide in 100 ml of 96% sulfuric acid at 25° C. by using a Canon Fenske viscometer, etc. The relative viscosity of the polyamide (A) is preferably from 1.6 to 4.4.

The polyamide (A) is preferably produced by polycondensing the diamine component with the dicarboxylic acid component such that the reaction molar ratio (mole number of reacted diamine component/mole number of reacted dicarboxylic acid component) is from 0.990 to 1.000, more preferably 0.991 to 0.999 and most preferably 0.992 to 0.998. When the reaction molar ratio exceeds 1.000, a biaxially stretched film having a stable transparency cannot be obtained because an excess of the terminal amino group causes increase of haze, gel formation upon extrusion, etc. When less than 0.990, the resulting polyamide (A) has a low molecular weight and a low viscosity, resulting in a poor dispersion of the smectite, and drawdown and uneven thickness in the molding process into films or bottles. The reaction molar ratio (r) is calculated from the following formula:

$$r=(1-cN-b(C-N))/(1-cC+a(C-N))$$

wherein a is $M_1/2$ wherein $M_1$ is a molecular weight (g/mol) of the diamine; b is $M_2/2$ wherein $M_2$ is a molecular weight (g/mol) of the dicarboxylic acid; c is 18.015; N is a terminal amino concentration (μeq/g); and C is a terminal carboxyl concentration (μeq/g).

The polyamide (A) preferably has a terminal amino concentration of 1 to 60 μeq/g, more preferably 5 to 55 μeq/g and most preferably 10 to 50 μeq/g. When the terminal amino concentration exceeds 60 μeq/g, the resulting biaxially stretched film prepared from the polyamide resin composition (C) exhibits an increased haze. By regulating the terminal amino concentration within the limited range, the increase of haze is prevented and the stable transparency is ensured, thereby enhancing the industrial and commercial values of the final products.

The terminal carboxyl concentration of the polyamide (A) is not specifically limed as far as the number-average molecular weight and the reaction molar ratio satisfied the above ranges.

A phosphorus compound may be added to the polyamide (A) to enhance a processing stability during the melt-kneading and prevent discoloration. The phosphorus compound is preferably an alkali metal- or alkaline earth metal-containing phosphorus compound. Examples thereof include phosphates, hypophosphites and phosphites of alkali metal or alkaline earth metal such as sodium, magnesium and calcium, with hypophosphites of alkali metal or alkaline earth metal being preferred because these hypophosphites are especially effective for preventing the discoloration of the polyamide. The concentration of the phosphorus compound is 500 ppm or lower, preferably 350 ppm or lower and more preferably 200 ppm or lower in terms of phosphorus atom contained in the polyamide (A). A phosphorus atom concentration exceeding 500 ppm is unfavorable because no additional effect of preventing the discoloration is obtained and the resulting biaxially stretched film rather suffers from increase in haze.

The polyamide (A) preferably has a water content of less than 0.2% by weight in view of a good moldability. When the water content of the polyamide (A) is 0.2% by weight or higher, the dispersibility of the smectite is lowered, and the decrease of the molecular weight and the formation of gelled masses are likely to occur. Therefore, the polyamide (A) is preferably dried before use. The drying may be performed by known methods, for example, but not limited to, a method in which water is removed by evacuating the interior of a cylinder of a vented extruder by a vacuum pump upon melt-extruding the polyamide to remove water, and a method of heating the polyamide in a tumbler (rotary vacuum vessel) under reduced pressure at a temperature not higher than the melting point of the polymer.

The polyamide resin composition (C) of the present invention (100 parts by weight) contains the polyamide (A) in an amount of preferably 80 to 99.9 parts by weight and more preferably 85 to 99 parts by weight. When the content of the polyamide (A) is less than 80 parts by weight, the resulting biaxially stretched film has a poor transparency. When the content exceeds 99.9 parts by weight, a sufficient amount of the smectite cannot be blended, thereby failing to improve the gas barrier property.

The smectite (B) is a dioctahedral or trioctahedral phyllosilicate having a charge density of 0.25 to 0.6. Examples of the dioctahedral phyllosilicates include montmorillonite, beidellite and nontronite. Examples of the trioctahedral phyllosilicates include hectorite and saponite. Of these smectites, preferred is montmorillonite because of its high swelling property that allows the swelling by penetration to easily expand the interlaminar space, thereby making montmorillonite easily dispersible in the polyamide resin composition (C).

The smectite (B), i.e., phyllosilicate, may be directly blended with the polyamide (A). Preferably, the phyllosilicate is blended after contacting an organic swelling agent to expand the interlaminar space, because the dispersibility of the smectite is improved. If the polyamide (A) is mixed with a smectite composition comprising the smectite (B) and the organic swelling agent, the content of organic swelling agent is preferably 50% by weight or lower of the smectite composition. When the content of the organic swelling agent exceeds 50% by weight, the film prepared from the polyamide resin composition (C) exhibits an increased haze.

The organic swelling agent is preferably a quaternary ammonium salt, and more preferably a quaternary ammonium salt having at least one alkyl or alkenyl group each having 12 or more carbon atoms. Examples of the organic swelling agents include trimethylalkylammonium salts such as trimethyldodecylammonium salts, trimethyltetradecylammonium salts, trimethylhexadecylammonium salts, trimethyloctadecylammonium salts and trimethyleicosylammonium salts; trimethylalkenylammonium salts such as trimethyloctadecenylammonium salts and trimethyloctadecadienylammonium salts; triethylalkylammonium salts such as triethyldodecylammonium salts, triethyltetradecylammonium salts, triethylhexadecylammonium salts and triethyloctadecylammonium salts; tributylalkylammonium salts such as tributyldodecylammonium salts, tributyltetradecylammonium salts, tributylhexadecylammonium salts and tributyloctadecylammonium salts; dimethyldialkylammonium salts such as dimethyldidodecylammonium salts, dimethylditetradecylammonium salts, dimethyldihexadecylammonium salts, dimethyldioctadecylammonium salts and dimethylditallowammonium salts; dimethyldialkenylammonium salts such as dimethyldioctadecenylammonium salts and dimethyldioctadecadienylammonium; diethyldialkylammonium salts such as diethyldidodecylammonium salts, diethylditetradecylammonium salts, diethyldihexadecylammonium salts and diethyldioctadecylammonium salts; dibutyldialkylammonium salts such as dibutyldidodecylammonium salts, dibutylditetradecylammonium salts, dibutyldihexadecylammonium salts and dibutyldioctadecylammonium salts; methylbenzyldialkylammonium salts such as methylbenzyldihexadecylammonium salts; dibenzyldialkylammonium salts such as dibenzyldihexadecylammonium salts; trialkylmethylammonium salts such as tridodecylmethylammonium salts, tritetradecylmethylammonium salts and trioctadecylmethylammonium salts; trialkylethylammonium salts such as tridodecylethylammonium salts; trialkylbutylammonium salts such as tridodecylbutylammonium salts; and ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid and 18-aminooctadecanoic acid. Of these organic swelling agents, preferred are trimethyldodecylammonium salts, trimethyltetradecylammonium salts, trimethylhexadecylammonium salts, trimethyloctadecylammonium salts, dimethyldidodecylammonium salts, dimethylditetradecylammonium salts, dimethyldihexadecylammonium salts, dimethyldioctadecylammonium salts and dimethylditallowammonium salts. These organic swelling agents may be used alone or in combination of two or more.

The polyamide resin composition (C) contains the smectite (B) in an amount of preferably 0.1 to 10 parts by weight, more preferably 0.5 to 8 parts by weight and most preferably 0.8 to 6 parts by weight based on 100 parts by weight of the polyamide (A). When the content of the smectite (B) is less than 0.1% by weight, no effect of improving the gas barrier property is obtained. When exceeding 10 parts by weight, the smectite is not uniformly dispersed in the polyamide, thereby failing to attain the corresponding effect of improving the gas barrier property and further resulting in unpractically high haze of the resultant film.

The polyamide (A) and the smectite (B) are melt-kneaded, for example, by a method of adding the smectite to the polyamide during the melt polymerization with stirring, or a method of melt-kneading in an ordinarily extruder such as single-screw or twin-screw extruders. The method using a twin-screw extruder is preferred because of its excellent kneading capability. The melt-kneading is preferably performed at 220 to 300° C. for a residence time of 1200 s or shorter. When the melt-kneading temperature is lower than 220° C., the dispersion of the phyllosilicate becomes poor.

A melt-kneading temperature exceeding 300° C. or a residence time exceeding 1200 s is undesirable because of the reduction of the molecular weight due to thermal decomposition and the formation of gels.

The smectite (B) is preferred to be uniformly dispersed in the polyamide resin composition (C) without any local agglomeration. The "uniform dispersion" referred to herein means that the smectite (B) is separated into flat plate layers in the polyamide resin composition (C) and 50% or more of the interlaminar spacing is 5 nm or larger and preferably 6 nm or larger. The "interlaminar spacing" referred to herein means a distance between gravity centers of the adjacent two flat plate layers. As the spacing increases, the smectite comes to be dispersed well. When the percentage of the interlaminar spacing of 5 nm or larger is less than 50%, the resulting biaxially stretched film exhibits a high haze and fails to be improved in the gas barrier property.

The polyamide resin composition (C) preferably has a melt viscosity of 80 to 3,000 Pa.s, more preferably 100 to 2,000 Pa.s and most preferably 150 to 1,500 Pa.s when measured at a shear rate of 100/s at 270° C. When the melt viscosity is less than 80 Pa.s, there occur defects such as drawdown and uneven thickness upon molding a biaxially stretched films and bottles owing to an excessively low melt viscosity. When exceeding 3,000 Pa.s, the melt viscosity is too high to make the molding into biaxially stretched films and bottles difficult by ordinarily machines.

The polyamide resin composition (C) preferably has a water content of less than 0.2% by weight in view of a good moldability. When the water content is 2% by weight or higher, the reduction of the molecular weight, the formation of gelled masses and the drawdown are likely to occur in the film-forming process. Therefore, the polyamide resin composition (C) is preferably dried before the use. The polyamide resin composition (C) may be dried by known methods, for example, but not limited to, by a method wherein water is removed by evacuating the interior of a cylinder of a vented extruder by a vacuum pump upon extruding the polyamide resin composition or a method of heating under reduced pressure the polyamide resin composition in a tumbler (rotary vacuum vessel) at a temperature not higher than a melting point of the polyamide.

The polyamide resin composition (C) may be blended with another thermoplastic resin such as nylon 6, nylon 66, nylon 6,66, polyesters and polyolefins unless the effects of the present invention are not adversely affected. Further, the polyamide resin composition (C) may also contain various additives, for example, inorganic fillers such as glass fibers and carbon fibers; plate-like inorganic fillers such as glass flakes, talc, kaolin and mica; impact modifiers such as elastomers; nucleating agents; lubricants such as fatty acid amides and metal salts of fatty acids; antioxidants such as copper compounds, organic or inorganic halogen compounds, hindered phenols, hindered amines, hydrazines, sulfur compounds and phosphorus compounds; heat stabilizers; anti-coloring agents; ultraviolet absorbers such as benzotriazoles; mold release agents; plasticizers; colorants; flame retardants; oxygen-capturing agents such as cobalt-containing compounds; and anti-gelation agents such as alkali compounds.

The biaxially stretched film of the present invention is produced from the polyamide resin composition (C) by a successive biaxial stretching preferably under conditions simultaneously satisfying the following formulae (1) to (6):

$$Tg \leq T \leq Tg+85 \quad (1)$$

$$0 < t_2 \leq 100 \quad (2)$$

$$1000 \geq (x/x_0) \times 100/t_1 \geq 100 \quad (3)$$

$$1000 \geq (y/y_0) \times 100/(t_3-t_2) \geq 50 \quad (4)$$

$$500 \geq (x/x_0) \times 100 > 150 \quad (5)$$

$$500 \geq (y/y_0) \times 100 > 150 \quad (6)$$

wherein Tg is a glass transition temperature of the polyamide (A); T is a stretching temperature; $t_1$ is a stretching time by second along x-axis; $t_2$ is a time by second taken from initiation of x-axis stretching to initiation of y-axis stretching; $t_3$ is a time by second taken from initiation of x-axis stretching to completion of y-axis stretching; $x_0$ is an x-axis length of a film before stretching; x is an x-axis length of a film after stretching; $y_0$ is a y-axis length of a film before stretching; and y is a y-axis length of a film after stretching, provided that the x-axis and the y-axis are perpendicular to each other and when one of the x-axis and y-axis is directed to MD direction (extruding direction of film), the other is directed to TD direction (width direction of film).

The stretching temperature is preferably in the range represented by the formula (1), i.e., from Tg to Tg+85° C. and more preferably from Tg+5° C. to Tg+75° C. When the stretching temperature is lower than the glass transition temperature Tg of the polyamide (A), the stretching of the film requires an extremely high stress, resulting in the break of the film or the increase of haze to reduce the transparency. When the stretching temperature exceeds Tg+85° C., the crystallization speed of the polyamide resin composition (C) becomes too high, making the stretching of the film difficult or increasing the film haze to reduce the transparency. The x-axis stretching temperature and the y-axis stretching temperature may be the same or different. However, if the y-axis stretching temperature is lower than the x-axis stretching temperature, the stretching stress becomes considerably increased to make a uniform stretching difficult and frequently cause break of the film.

The biaxially stretched film of the present invention is preferably produced by the condition satisfying the formula (2). A condition of $t_2=0$ means simultaneous biaxial stretching, which is unfavorable because the film haze is increased to result in the failure of producing a biaxially stretched film excellent in the transparency.

The stretching speeds are preferred to be in the ranges represented by the formulae (3) and (4). The x-axis stretching speed defined by the formula (3) and the y-axis stretching speed defined by the formula (4) may be the same or different to obtain a biaxially stretched film having a low haze and a good transparency. When the x-axis stretching speed defined by the formula (3) is less than 100%/s or the y-axis stretching speed defined by the formula (4) is less than 50%/s, the haze of a resulting biaxially stretched film increased to reduce the transparency.

The x-axis and y-axis stretching ratios are preferably in the ranges represented by the formulae (5) and (6). Each stretching ratio is more preferably 200% or higher and most preferably 250% or higher. The x-axis stretching ratio defined by the formula (5) and the y-axis stretching ratio defined by the formula (6) may be the same or different to obtain a biaxially stretched film having a low haze and a good transparency. When each stretching ratio is less than 150%, the film haze becomes high to fail in obtaining a good transparency of the biaxially stretched film.

The preheating time upon stretching is preferably 0 to 180 s, more preferably 10 to 150 s and most preferably 20 to 120 s. A preheating time exceeding 180 s increases the film haze to reduce the transparency of a biaxially stretched film The layer made of the polyamide resin composition (C) of the biaxially stretched film of the present invention shows two strong peaks (strongest peak and next stronger peak) in a diffraction angle 2θ ranging from 15° to 25° on a CuKα X-ray diffraction pattern. A relative intensity ratio C of the two peaks represented by the following formula:

$$C = (B/A) \times 100$$

wherein A is the intensity of the peak at a lower diffraction angle and B is the intensity of the peak at a higher diffraction angle, is preferably 60 or less and more preferably 5 to 55.

When the relative intensity ratio exceeds 60, the haze becomes impracticably high although the gas barrier property is improved.

The symbol "θ" represents a Bragg angle (also referred to as incident angle or reflection angle) at which X-ray with a wavelength λ is diffracted on a lattice plane having a spacing d, and "2θ" is referred to as a diffraction angle.

The positions of the peaks in the X-ray diffraction analysis were determined as follows. The profile obtained by the analysis was smoothed by Savitzky-Golay smoothing method, followed by the removal of background by Sonnevelt-Visser method and the removal of Kα2 ray by Rachinger method. The obtained intensity data were subjected to second differential to obtain minimum values that were determined to be the respective peak positions. Each of the peak intensities A and B was defined as a calculated height from the background position up to the peak position.

The spacing d corresponding to the peak at lower angle is about 4.7 Å, and the spacing d corresponding to the peak at higher angle is about 4.2 Å (refer to Tables 4 and 6 shown below). In general, the crystal structure is characterized by lattice plane, spacing, etc. According to T. Ohta et al. "POLYMER", Vol. 33, No. 8, pp. 1620–1622 (1992), the crystal structure of poly(m-xylyleneadipamide) is characterized by lattice plane (100) with a spacing d of 4.72 Å, lattice plane (010) with a spacing d of 4.20 Å and lattice plane (110) with a spacing d of 4.17 Å.

Therefore, it is considered in the present invention that the peak at lower angle represents a lattice plane (100), and the peak at higher angle represents lattice planes (010) and (110). It is reported that the lattice plane (100) shows a plane bonded by hydrogen bond, i.e., a folded structure of poly (m-xylyleneadipamide), and the lattice planes (010) and (110) show crystal structures other than the folded structure of poly(m-xylyleneadipamide). The fact that the relative intensity ratio is higher than 60 indicates that the poly(m-xylyleneadipamide) contains a larger amount of crystals having the lattice planes (010) and (110), namely is disordered in its crystal structure.

In case of the polyamide (A) produced by polycondensation of a diamine component containing 70 mol % or higher of m-xylylenediamine and a dicarboxylic acid component containing 70 mol % or higher of a $C_4$–$C_{20}$ α,ω-linear aliphatic dicarboxylic acid, the increase of haze and the deterioration of transparency do not occur even if the ratio of the higher angle peak intensity B to the lower angle peak intensity A (relative intensity=(B/A)×100) is 60 or more.

However, in case of the biaxially stretched film of the polyamide resin composition (C) obtained by melt-kneading the polyamide (A) and the smectite (B), the haze is increased to cause the whitening of film because spherulites develop around the dispersed smectite particles serving as the nuclei for the crystallization. The lattice planes (010) and (110) act as the starting points for the formation of lamellas and the growth of spherulites derived from lamellas. Therefore, if a large amount of the lattice planes (010) and (110) are present, in combination with the crystal nuclei effect of the smectite, a large amount of spherulites are formed and acceleratedly grown in the crystalline structure of poly(m-xylyleneadipamide), thereby increasing the haze.

In the process of the present invention, therefore, the formation of the crystal structures of the lattice planes (010) and (110) is inhibited and the formation of the crystal structure of the lattice plane (100) is selectively increased in the biaxially stretched film of the polyamide resin composition (C). With such crystal structures, the crystallinity is well-controlled, the orientation is enhanced and the growth of spherulites is inhibited, thereby preventing the whitening by the stretching to provide a biaxially stretched film having a low haze and an excellent transparency.

The film-forming method usable in the present invention is not particularly restricted, and there may be used any known film-forming methods such as a method of drying a solution of a polyamide resin composition to remove the solvent, a monoaxial stretching method and a biaxial stretching method. In view of easiness of industrial production and high productivity, especially preferred is a successive biaxial stretching method.

In the present invention, the biaxially stretched film may be produced by first forming a sheet by known methods such as a T-die method or a tubular method where a tube extruded from a ring die is cooled by air or water, and then biaxially stretching the thus formed sheet by known methods such as a tenter method or a tubular method.

The biaxially stretched film of the present invention may be used without any further treatment, or may be further stretched in a direction before use to improve physical properties in the direction. Further, the stretched film may be heat-treated, if desired, to make it thermally stable.

The biaxially stretched film of the present invention has a haze of 10%/20 μm or lower, therefore, exhibits a good transparency.

The biaxially stretched film has an oxygen permeability constant of less than 0.5 ml·mm/m²·day·MPa as measured at 23° C. and a relative humidity of 60%, therefore, exhibits a good gas barrier property.

Thus, the biaxially stretched film of the present invention exhibits excellent oxygen barrier property and transparency and are suitably used as packaging materials requiring good oxygen barrier property and transparency.

The biaxially stretched film of the present invention may be formed into a multi-layer film having another thermoplastic resin layer to enhance mechanical properties. Examples of the thermoplastic resins include, but are not limited to, polyethylenes such as low-density polyethylene, medium-density polyethylene and high-density polyethylene; polypropylenes such as propylene homopolymer, propylene-ethylene block copolymers and propylene-ethylene random copolymers; various polyolefins such as ethylene-butene copolymers, ethylene-hexene copolymers, ethylene-octene copolymers, ethylene-vinyl acetate copolymers, ethylene-methyl methacrylate copolymers, propylene-α-olefin copolymers, polybutene, polypentene and ionomer resins; polystyrene, polyester resins such as polyethylene terephthalate; and polyamide resins such as nylon 6 and nylon 66. In the multi-layer film, an adhesive resin layer of a modified polyolefin resin, etc., may be interposed between the resin layers, if desired. The multi-layer film may be produced by known methods such as co-extrusion methods, e.g., T-die method and inflation method, a lamination method in which non-stretched or stretched films are dry-laminated or extrusion-laminated.

The biaxially stretched film of the present invention is used as packaging materials having an excellent transparency and gas barrier property, for example, for wrapping materials with a single-layer structure or a multi-layer structure with another resin layer, pouches of various shapes, caps of containers, etc. The packaging containers using the biaxially stretched film are excellent in the gas barrier property and the transparency, and are suitable for preserving various products. Examples of the products to be preserved include liquid beverages such as carbonated beverage, juice, water, milk, sake, whisky, shochu, coffee, tea, jelly beverage and healthy beverage; seasonings such as liquid seasoning, sauce, soy sauce, dressing, liquid soup stock, mayonnaise, miso and grated spices; pasty foodstuffs such as jam, cream and chocolate paste; liquid foodstuffs represented by liquid processed foodstuffs such as liquid soup, boiled food, pickles and stew; raw or boiled noodles such as buckwheat noodle, wheat noodle and Chinese noodle; uncooked or boiled rice such as polished rice, water-conditioned rice and washing-free rice; processed rice products such as boiled rice mixed with fish and vegetables, rice boiled together with red beans and rice gruel; high water content foodstuffs represented by powdery seasonings such as powdery soup and powdery soup stock; low water content foodstuffs such as dehydrated vegetables, coffee beans, coffee powder, leaf tea and confectioneries made of cereals; solid and liquid chemicals such as agricultural chemicals and insecticides; and liquid or past products such as drugs, beauty wash, cosmetic cream, milky lotion, hair dressing, hair dye, shampoo, soap and detergent.

The present invention will be described in more detail below with reference to the following examples. However, these examples are only illustrative and not intended to limit the scope of the invention thereto.

In the following examples and comparative examples, polyamide resin compositions were evaluated by the following methods.

(1) Terminal Amino Concentration of Polyamide

Accurately weighed 0.3 to 0.5 g polyamide was dissolved into 30 ml of a phenol/ethanol mixed solution (4/1 by volume) at 20 to 30° C. under stirring. After the complete dissolution, the resulting solution was subjected to neutralization titration with a 1/100 N hydrochloric acid by using an automatic titration apparatus available from Mitsubishi Chemical Corp. to determine the terminal amino concentration.

(2) Terminal Carboxyl Concentration of Polyamide

Accurately weighed 0.3 to 0.5 g polyamide was dissolved under nitrogen gas flow into 30 ml of benzyl alcohol at 160 to 180° C. under stirring. After the complete dissolution, the resulting solution was cooled to 80° C. under nitrogen gas flow, added with 10 ml of methanol under stirring, and subjected to neutralization titration with a 1/100 N aqueous sodium hydroxide solution by using an automatic titration apparatus available from Mitsubishi Chemical Corp. to determine the terminal amino concentration.

(3) Relative Viscosity of Polyamide

One gram of polyamide was accurately weighed and dissolved in 100 cc of 96% sulfuric acid at 20 to 30° C. under stirring. After complete dissolution, 5 cc of the resulting solution was immediately placed in a Canon Fenske viscometer. After the viscometer was allowed to stand in a thermostatic chamber maintained at 25±0.03° C. for 10 min, a dropping time (t) was measured. Also, a dropping time ($t_0$) of the 96% sulfuric acid solely was measured. The relative viscosity of the polyamide was calculated from the measured t and $t_0$ according to the following formula:

Relative Viscosity=$(t)/(t_0)$.

(4) Water Content

Measured at 235° C. for 50 min in a nitrogen atmosphere by using a trace water analyzer "CA-05" available from Mitsubishi Chemical Corp.

(5) Haze

Measured on a biaxially stretched film according to ASTM D1003 using a color difference-turbidity meter "COH-300A" available from Nippon Denshoku Kogyo Co., Ltd.

(6) Oxygen Permeability Constant

Measured on a biaxially stretched film at 23° C. and a relative humidity of 60% according to ASTM D3985 using "OX-TRAN 10/50A" available from Modern Controls Co., Ltd.

(7) X-Ray Diffraction

Performed using an analyzer "MINIFLEX" available from Rigakusha Co., Ltd. under conditions of: CuKα for X-ray source, 4.2° of scattering slit, 0.3 mm of light-receiving slit, 30 kV of lamp voltage, 15 mA of lamp current, 2 to 50° of scanning range, 0.02° of sampling width, and 5°/min of scanning speed.

The trade name of phyllosilicate used in the following examples and comparative examples is "NEW-D ORBEN" available from Shiraishi Kogyo Co., Ltd. (montmorillonite containing 42% by weight of dimethyldioctadecylammonium salt as a swelling agent).

In the following examples and comparative examples, polyamides MXD6 (polyamide A1 and polyamide A2) produced from m-xylylenediamine and adipic acid were used as polyamide (A). The properties of these polyamides are shown in Table 1 below.

TABLE 1

| Polyamide (A) | Polyamide A1 | Polyamide A2 |
|---|---|---|
| Glass transition temperature (° C.) | 85 | 85 |
| Terminal amino concentration (μeq/g) | 28 | 8 |
| Terminal carboxyl concentration (μeq/g) | 56 | 36 |
| Reaction molar ratio | 0.997 | 0.997 |
| Relative viscosity | 2.6 | 3.5 |
| Water content (%) | 0.07 | 0.08 |
| Number-average molecular weight | 25,000 | 40,000 |

EXAMPLE 1

After dry-blended, a mixture of 97 parts by weight of polyamide A1 and 3 parts by weight of montmorillonite (trade name: "NEW D ORBEN" available from Shiraishi Kogyo Co., Ltd.) was fed into a twin-screw extruder having a cylinder diameter of 37 mm at a feeding rate of 6 kg/h. The mixture was melt-kneaded in the extruder at a cylinder temperature of 240° C. and a screw-rotating speed of 500 rpm, extruded into molten strands, cooled to solid by cooling air, and then pelletized.

The pellets were fed into a T-die twin-screw extruder having a cylinder diameter of 20 mm at a feeding rate of 1.2 kg/h. The pellets were melt-kneaded at a cylinder temperature of 250° C. and a screw-rotating speed of 100 rpm, extruded through the T-die into a film which was solidified on a cooling roll at 72° C. while taking up at a speed of 0.7 m/min, thereby obtaining a film having a thickness of 280 μm.

The film was subjected to successive biaxial stretching by a successive biaxial stretching machine manufactured by Toyo Seiki Co., Ltd. under the following conditions: stretching temperature of 110° C.; preheating time of 30 s; stretching speed of 100%/s in both the x-axis and y-axis directions;

$t_2$ of 2.4 s (time elapsed from initiation of x-axis stretching to initiation of y-axis stretching); and stretching ratio of 3.6×3.6 times. The stretched film was then heat-treated by maintaining for 5 s in a precision thermostatic chamber "DF62" kept at 240° C. while holding the film by cramping between two 20 cm-squared perforated stainless steel plates. The results of evaluation of the biaxially stretched film are shown in Table 2.

EXAMPLE 2

A biaxially stretched film was produced by the same procedure as in Example 1 except for changing $t_2$ to 1.4 s and the stretching speed to 180%/s in both the x-axis and y-axis directions. The results are shown in Table 2.

EXAMPLE 3

After dry-blended, a mixture of 97 parts by weight of polyamide A2 and 3 parts by weight of montmorillonite (trade name: "NEW D ORBEN" available from Shiraishi Kogyo Co., Ltd.) was fed into a twin-screw extruder having a cylinder diameter of 37 mm at a feeding rate of 12 kg/h. The mixture was melt-kneaded in the extruder at a cylinder temperature of 270° C. and a screw-rotating speed of 300 rpm, extruded into molten strands, cooled to solid by cooling air, and then pelletized.

The pellets were fed into a T-die twin-screw extruder having a cylinder diameter of 20 mm at a feeding rate of 1.2 kg/h. The pellets were melt-kneaded at a cylinder temperature of 250° C. and a screw-rotating speed of 100 rpm, extruded through the T-die into a film which was solidified on a cooling roll at 72° C. while taking up at a speed of 0.7 m/min, thereby obtaining a film having a thickness of 280 μm.

The film was subjected to successive biaxial stretching by a successive biaxial stretching machine manufactured by Toyo Seiki Co., Ltd. under the following conditions: stretching temperature of 120° C.; preheating time of 30 s; stretching speed of 180%/s; $t_2$ of 1.4 s; and stretching ratio of 3.6×3.6 times. The stretched film was then heat-treated at 240° C. for 5 s. The results of evaluation of the biaxially stretched film are shown in Table 2.

TABLE 2

|  | Example 1 | Example 2 | Example 3 |
| --- | --- | --- | --- |
| Polyamide (A) | A1 | A1 | A2 |
| Stretching temperature (° C.) | 110 | 110 | 120 |
| $t_2$ (s) | 2.4 | 1.4 | 1.4 |
| Stretching speed (%/s) | 100 | 180 | 180 |
| Stretching ratio (MD × TD) | 3.6 × 3.6 | 3.6 × 3.6 | 3.6 × 3.6 |
| Heat-treating temperature (° C.) | 240 | 240 | 240 |
| Heat-treating time (s) | 5 | 5 | 5 |
| Haze (%/20 μm) | 8.8 | 8.0 | 5.2 |
| Relative intensity ratio | 54 | 44 | 36 |
| Melt viscosity of polyamide resin composition (C) (Pa · s) | 350 | 350 | 350 |

EXAMPLE 4

A biaxially stretched film was produced by the same procedure as in Example 3 except for changing the stretching ratio to 4.0×2.5 times and $t_2$ to 1.6 s. The results are shown in Table 3. The peak intensities observed in X-ray diffraction analysis of the film are shown in Table 4.

EXAMPLE 5

A biaxially stretched film was produced by the same procedure as in Example 3 except for changing the stretching ratio to 3.0×3.0 times and $t_2$ to 1.1 s. The results are shown in Table 3.

EXAMPLE 6

A biaxially stretched film was produced by the same procedure as in Example 4 except for heat-treating at 200° C. for 30 s. The results are shown in Table 3.

TABLE 3

|  | Example 4 | Example 5 | Example 6 |
| --- | --- | --- | --- |
| Polyamide (A) | A2 | A2 | A2 |
| Stretching temperature (° C.) | 120 | 120 | 120 |
| $t_2$ (s) | 1.6 | 1.1 | 1.6 |
| Stretching speed (%/s) | 180 | 180 | 180 |
| Stretching ratio (MD × TD) | 4.0 × 2.5 | 3.0 × 3.0 | 4.0 × 2.5 |
| Heat-treating temperature (° C.) | 240 | 240 | 200 |
| Heat-treating time (s) | 5 | 5 | 30 |
| Haze (%/20 μm) | 4.5 | 6.7 | 5.0 |
| Oxygen permeability constant (ml · mm/m$^2$ · day · MPa) | 0.33 | 0.33 | 0.29 |
| Relative intensity ratio | 34 | 44 | 39 |
| Melt viscosity of polyamide resin composition (C.) (Pa · s) | 550 | 550 | 550 |

TABLE 4

| Peak No. | 2θ | Half width | d | Intensity | Relative intensity |
| --- | --- | --- | --- | --- | --- |
| 1 | 2.860 | 0.306 | 30.8650 | 25 | 9 |
| 2 | 3.620 | 0.400 | 24.3866 | 19 | 7 |
| 3 | 13.580 | 0.329 | 6.5149 | 15 | 6 |
| 4 | 18.660 | 1.200 | 4.7511 | 303 | 100 |
| 5 | 21.080 | 1.059 | 4.2108 | 103 | 34 |
| 6 | 23.360 | 0.424 | 3.8048 | 20 | 7 |
| 7 | 24.820 | 0.353 | 3.5842 | 21 | 7 |
| 8 | 25.540 | 0.400 | 3.4847 | 24 | 8 |

COMPARATIVE EXAMPLE 1

A biaxially stretched film was produced by the same procedure as in Example 1 except for changing the stretching speed to 60%/s in both the x-axis and y-axis directions and $t_2$ to 4.3 s. The results are shown in Table 5.

COMPARATIVE EXAMPLE 2

A biaxially stretched film was produced by the same procedure as in Example 1 except for changing the stretching speed to 80%/s in both the x-axis and y-axis directions and $t_2$ to 3.2 s. The results are shown in Table 5.

COMPARATIVE EXAMPLE 3

A biaxially stretched film was produced by the same procedure as in Example 1 except that the film was biaxially stretched simultaneously at a strectching speed of 50%/s in both the x-axis and y-axis directions. The results are shown in Table 5. The peak intensities observed in X-ray diffraction analysis of the film are shown in Table 6.

TABLE 5

|  | Comparative Example 1 | Comparative Example 2 | Comparative Example 3 |
| --- | --- | --- | --- |
| Polyamide (A) | A1 | A1 | A1 |
| Stretching temperature (° C.) | 110 | 110 | 110 |
| $t_2$ (s) | 4.3 | 3.2 | 0 |

TABLE 5-continued

|  | Comparative Example 1 | Comparative Example 2 | Comparative Example 3 |
|---|---|---|---|
| Stretching speed (%/s) | 60 | 80 | 50 |
| Stretching ratio (MD × TD) | 3.6 × 3.6 | 3.6 × 3.6 | 3.6 × 3.6 |
| Heat-treating temperature (° C.) | 240 | 240 | 200 |
| Heat-treating time (s) | 5 | 5 | 5 |
| Haze (%/20 μm) | 12.2 | 12.1 | 16.4 |
| Relative intensity ratio | 65 | 65 | 68 |

TABLE 6

| Peak No. | 2θ | Half width | d | Intensity | Relative intensity |
|---|---|---|---|---|---|
| 1 | 2.680 | 0.376 | 32.9376 | 25 | 8 |
| 2 | 6.460 | 0.400 | 13.6705 | 22 | 7 |
| 3 | 18.740 | 1.294 | 4.7310 | 324 | 100 |
| 4 | 21.220 | 0.871 | 4.1834 | 219 | 68 |
| 5 | 24.820 | 0.447 | 3.5842 | 27 | 9 |
| 6 | 25.500 | 0.753 | 3.4901 | 43 | 14 |

COMPARATIVE EXAMPLE 4

The film prepared by the same method as in Example 3 was attempted to stretch using a biaxial stretching machine available from Toyo Seiki Co., Ltd. under the following conditions: stretching temperature of 80° C.; preheating time of 30 s; stretching speed of 180%/s; and stretching ratio of 3×3 times. However, the film was broken and failed to be stretched.

As described above, the biaxially stretched films of Examples 1 to 6 produced by biaxially stretching the polyamide resin composition (C) under the conditions of the present invention were excellent in the transparency and the gas barrier property. On the other hand, the films of Comparative Examples 1 and 2 were increased in haze and poor in transparency because the stretching speed did not meet the requirement (3). In Comparative Example 3, the film haze was increased to show a poor transparency because the requirements (2) and (3) were not satisfied. In Comparative Example 4, a stretched film was not obtained by breaking during the stretching because the requirement (1) was not met.

EXAMPLE 7

A linear low-density polyethylene (trade name: "ULTZEX2022L" available from Mitsui Petrochemical Co., Ltd.; hereinafter referred to as "LLDPE") for a layer I was extruded at 200 to 210° C. from an extruder having a cylinder diameter of 45 mm, and simultaneously pellets of the polyamide resin composition (C) obtained in Example 3 for a layer II were extruded from an extruder having a cylinder diameter of 30 mm at 240 to 270° C. The extrudates were stacked through a feed block to form a molten multi-layer structure of layer I/layer II/layer I, which was made into a multi-layer film by a cylindrical die-water cooling inflation method. The multi-layer film was biaxially stretched at a stretching ratio of 3.6×3.6 times by a tubular method under the following conditions: stretching temperature of 120° C.; preheating time of 30 s; stretching speed of 180%/s; and $t_2$ of 1.4 s, and then heat-treated at 240° C. for 5 s. The results of evaluation on the multi-layer biaxially stretched film are shown in Table 7. The relative intensity ratio was measured by X-ray diffraction analysis on the layer I taken from the multi-layer film.

EXAMPLE 8

LLDPE for a layer I was extruded at 200 to 210° C. from an extruder having a cylinder diameter of 45 mm, and simultaneously pellets of the polyamide resin composition (C) obtained in Example 3 for a layer II were extruded from an extruder having a cylinder diameter of 30 mm at 240 to 270° C. The extrudates were stacked through a feed block to form a molten multi-layer structure of layer I/layer II/layer I, which was extruded through a T-die to produce a multi-layer film. The multi-layer film was biaxially stretched at a stretching ratio of 3.6×3.6 times by a biaxial stretching machine available from Toyo Seiki Co., Ltd. under the following conditions: stretching temperature of 120° C.; preheating time of 30 s; stretching speed of 180%/s; and $t_2$ of 1.4 s, and then heat-treated at 240° C. for 5 s. The results of evaluation on the multi-layer biaxially stretched film are shown in Table 7. The relative intensity ratio was measured by X-ray diffraction analysis on the layer I taken from the multi-layer film.

EXAMPLE 9

Polyethylene terephthalate (trade name: "PET543C" available from Nippon Unipet Co., Ltd.; hereinafter referred to as "PET") for forming a layer I was extruded from an extruder having a cylinder diameter of 45 mm at 260 to 290° C., and simultaneously pellets of the polyamide resin composition (C) obtained in Example 3 for a layer II were extruded from an extruder having a cylinder diameter of 30 mm at 240 to 270° C. The extrudates were stacked through a feed block to form a molten multi-layer structure of layer I/layer II/layer I, which was extruded through a T-die to produce a multi-layer film. The multi-layer film was biaxially stretched at a stretching ratio of 3.6×3.6 times by a biaxial stretching machine available from Toyo Seiki Co., Ltd. under the following conditions: stretching temperature of 120° C.; preheating time of 30 s; stretching speed of 180%/s; and $t_2$ of 1.4 s, and then heat-treated at 240° C. for 5 s. The results of evaluation on the multi-layer biaxially stretched film are shown in Table 7. The relative intensity ratio was measured by X-ray diffraction analysis on the layer I taken from the multi-layer film.

COMPARATIVE EXAMPLE 5

The multi-layer film obtained in Example 8 was biaxially stretched at a stretching ratio of 3.6×3.6 times by a biaxial stretching machine available from Toyo Seiki Co., Ltd. under the following conditions: stretching temperature of 120° C.; preheating time of 30 s; stretching speed of 110%/s; and $t_2$ of zero, and then heat-treated at 240° C. for 5 s. The results of evaluation on the multi-layer biaxially stretched film are shown in Table 7. The relative intensity ratio was measured by X-ray diffraction analysis on the layer I taken from the multi-layer film.

TABLE 7

|  | Example 7 | Example 8 | Example 9 | Comparative Example 5 |
|---|---|---|---|---|
| Layer I | LLDPE | LLDPE | PET | LLDPE |
| Stretching temperature (° C.) | 120 | 120 | 120 | 120 |
| $t_2$ (s) | 1.4 | 1.4 | 1.4 | 0 |
| Stretching speed (%/s) | 180 | 180 | 180 | 110 |
| Stretching ratio (MD × TD) | 3.6 × 3.6 | 3.6 × 3.6 | 3.6 × 3.6 | 3.6 × 3.6 |

TABLE 7-continued

|  | Example 7 | Example 8 | Example 9 | Comparative Example 5 |
|---|---|---|---|---|
| Heat-treating temperature (° C.) | 240 | 240 | 240 | 240 |
| Heat-treating time (s) | 5 | 5 | 5 | 5 |
| Haze (%/20 μm) | 2.4 | 3.2 | 3.3 | 17 |
| Oxygen permeability constant of layer II (ml · mm/m² · day · MPa) | 0.33 | 0.22 | 0.30 | — |
| Relative intensity ratio | 35 | 41 | 40 | 70 |

As described above, when biaxially stretched under the conditions of the present invention (Examples 7 to 9), the resultant multi-layer film containing the polyamide resin composition (C) were excellent in the transparency and the gas barrier property. On the other hand, in Comparative Example 5 not satisfying the requirement (2), the film haze was increased and the transparency was poor.

The biaxially stretched film made of the polyamide resin composition according to the present invention and packaging containers produced therefrom are excellent in gas barrier property and transparency, and therefore, have high commercial and industrial values.

What is claimed is:

1. A biaxially stretched film comprising a polyamide resin composition (C) obtained by melt-kneading a smectite (B) with a polyamide (A) produced by the polycondensation of a diamine component containing 70 mol % or higher of m-xylylenediamine and a dicarboxylic acid component containing 70 mol % or higher of a $C_4$–$C_{20}$ α,ω-linear aliphatic dicarboxylic acid, or comprising at least one layer made of the polyamide resin composition (C), wherein the polyamide resin composition (C) comprises the polyamide (A) in an amount of 80 to 99.9 parts by weight and the smectite (B) in an amount of 0.1 to 10 parts by weight wherein the biaxially stretched film comprising the polyamide resin composition (C) or the at least one layer made of the polyamide resin composition (C) has a relative peak intensity ratio of 60 or less, the relative peak intensity ratio being represented by the formula:

B/A×100 wherein A and B are intensities of a strongest peak and a next stronger peak appearing in a diffraction angle 2θ ranging from 15° to 25° of a CuKα X-ray diffraction pattern of the layer made of the polyamide resin composition (C), provided that A is the peak intensity of the peak at a lower angle and B is the peak intensity of the peak at a higher angle.

2. The biaxially stretched film according to claim 1, wherein the polyamide (A) is produced by polycondensing the diamine component with the dicarboxylic acid component in a reaction molar ratio of 0.990 to 1.000 and has a terminal amino concentration of 1 to 60 μeq/g, the reaction molar ratio being a ratio of a mole number of reacted diamine component to a mole number of reacted dicarboxylic acid component.

3. The biaxially stretched film according to claim 1, wherein the smectite (B) is separated into flat plates in the polyamide (A), and 50% or more of interlaminar spacing of the plates is 5 nm or larger.

4. The biaxially stretched film according to claim 1, wherein the smectite (B) is montmorillonite.

5. The biaxially stretched film according to claim 1, wherein the smectite (B) is treated with an organic swelling agent.

6. The biaxially stretched film according to claim 1, wherein the polyamide resin composition (C) has a melt viscosity of 80 to 3,000 Pa·s when measured at a shear rate of 100/s and 270° C.

7. The biaxially stretched film according to claim 1, wherein the biaxially stretched film has a haze of 10%/20 μm or lower.

8. A packaging container comprising at least a part thereof the biaxially stretched film as defined in claim 1.

9. A process for producing a biaxially stretched film comprising a polyamide resin composition (C) obtained by melt-kneading a smectite (B) with a polyamide (A) produced by the polycondensation of a diamine component containing 70 mol % or higher of m-xylylenediamine and a dicarboxylic acid component containing 70 mol % or higher of a $C_4$–$C_{20}$ α,ω-linear aliphatic dicarboxylic acid, or comprising at least one layer made at the polyamide resin composition (C), the process comprising a step of successively and biaxially stretching a non-stretched film comprising the polyamide resin composition (C) or comprising at least one layer made of the polyamide resin composition (C) under conditions simultaneously satisfying the following formulae (1) to (6):

$$Tg \leq T \leq Tg+85 \tag{1}$$

$$0 < t_2 \leq 100 \tag{2}$$

$$1000 \geq (x/x_0) \times 100/t_1 \geq 100 \tag{3}$$

$$1000 \geq (y/y_0) \times 100/(t_3-t_2) \geq 50 \tag{4}$$

$$500 \geq (x/x_0) \times 100 \geq 150 \tag{5}$$

$$500 \geq (y/y_0) \times 100 \geq 150 \tag{6}$$

wherein Tg is a glass transition temperature of the polyamide (A); T is a stretching temperature; $t_1$ is a stretching time by second along x-axis; $t_2$ is a time by second taken from initiation of x-axis stretching to initiation of y-axis stretching; $t_3$ is a time by second taken from initiation of x-axis stretching to completion of y-axis stretching; $x_0$ is an x-axis length of a film before stretching; x is an x-axis length of a film after stretching; $y_0$ is a y-axis length of a film before stretching; and y is a y-axis length of a film after stretching, provided that the x-axis and the y-axis are perpendicular to each other and when one of the x-axis and y-axis is directed to MD direction (extruding direction of film), the other is directed to TD direction (width direction of film).

10. A biaxially stretched film comprising at least one layer made of a polyamide resin composition (C) obtained by melt-kneading a smectite (B) with a polyamide (A) produced by the polycondensation of a diamine component containing 70 mol % or higher of m-xylylenediamine and a dicarboxylic acid component containing 70 mol % or higher of a $C_4$–$C_{20}$ α,ω-linear aliphatic dicarboxylic acid, wherein the at least one layer made of the polyamide resin composition (C) has a relative peak intensity ratio of 60 or less, the relative peak intensity ratio being represented by the formula:

B/A×100 wherein A and B are intensities of a strongest peak and a next stronger peak appearing in a diffraction angle 2θ ranging from 15 to 25° of a CuKα, X-ray diffraction pattern of the layer made of the polyamide resin composition (C), provided that A is the peak intensity of the peak at a lower angle and B is the peak intensity of the peak at a higher angle.

11. The biaxially stretched film according to claim 10, wherein the biaxially stretched film comprises a single layer made of the polyamide resin composition (C).

12. The biaxially stretched film according to claim 10, wherein the biaxially stretched film comprises a multi-layer film having at least one layer made of the polyamide resin composition (C).

13. The biaxially stretched film according to claim 12, wherein the multi-layer film comprises at least one layer made of the polyamide resin composition (C) and at least one layer made of another thermoplastic resin.

* * * * *